United States Patent [19]
Wittner

[11] Patent Number: 5,556,564
[45] Date of Patent: Sep. 17, 1996

[54] CONTROL UNIT FOR CONTROLLING THE TEMPERATURE OF A DOMESTIC WATER SUPPLY

[75] Inventor: Lupu Wittner, Netanya, Israel

[73] Assignee: Target Custom Made Software & Computer Ltd., Ramat Gan, Israel

[21] Appl. No.: 433,711

[22] Filed: May 2, 1995

[30] Foreign Application Priority Data

May 2, 1994 [IL] Israel ............................................ 109502

[51] Int. Cl.⁶ .................................................... H05B 1/02
[52] U.S. Cl. ........................... 219/494; 219/497; 219/501; 219/506; 219/485
[58] Field of Search .................................... 219/492, 494, 219/497, 499, 501, 506, 485; 307/117, 119

[56] References Cited

U.S. PATENT DOCUMENTS

| | | |
|---|---|---|
| 4,186,873 | 2/1980 | Geisler et al. . |
| 4,206,872 | 6/1980 | Levine . |
| 4,297,557 | 10/1981 | Tyler et al. . |
| 4,317,018 | 2/1982 | Denny et al. . |
| 4,518,839 | 5/1985 | Taguchi et al. ................. 219/10.55 R |
| 4,568,821 | 2/1986 | Boe ........................................ 219/419 |
| 4,588,875 | 5/1986 | Kozak et al. . |
| 4,593,169 | 6/1986 | Thomas . |
| 4,935,603 | 6/1990 | Iwamoto et al. ..................... 219/330 |
| 5,023,432 | 6/1991 | Boykin et al. ....................... 219/497 |
| 5,390,277 | 2/1995 | Van Wagner et al. ............... 219/485 |
| 5,442,157 | 8/1995 | Jackson ................................ 219/497 |

*Primary Examiner*—Mark H. Paschall
*Attorney, Agent, or Firm*—Helfgott & Karas, PC

[57] ABSTRACT

A control unit for controlling the temperature of a domestic water supply, comprising a temperature sensor for inserting into a water tank so as to produce a sensor signal representative of actual water temperature in a region of the temperature sensor and an electrical immersion heater for inserting into the water tank and energized by a source of electrical power. A setting device is adjusted by a user for setting a desired water temperature and producing a corresponding set signal, and a controllable switch is connected between the source of electrical power and the electrical immersion heater, and is responsive to the sensor signal and to the set signal for closing if the actual water temperature is lower than the desired water temperature and for opening if the actual water temperature is greater than the desired water temperature.

14 Claims, 4 Drawing Sheets

CONTROL UNIT FOR CONTROLLING THE TEMPERATURE OF A DOMESTIC WATER SUPPLY

FIELD OF THE INVENTION

This invention relates to domestic hot water installations and, in particular, to thermostatic control of the water temperature in such devices.

BACKGROUND OF THE INVENTION

Domestic hot water installations typically include a hot water tank which may be situated within a house or apartment or, alternatively, on the roof thereof. In either case, the hot water temperature is normally factory set, provision possibly being made for adjustment thereof during installation. Typically, such adjustment requires specialized knowledge and/or tooling and is beyond the ability of the average house-holder.

In such hot water systems, the water is maintained at the same constant temperature throughout both winter and summer. This is, clearly, an extravagant waste of energy since during the summer, when the ambient air temperature is high, a comfortable bath or shower can be enjoyed at a very much lower hot water temperature than during the winter months when the ambient air temperature is low. However, owing to the difficulty of adjusting the water temperature, the desired water temperature is factory set to a relatively high value such as 70° C. suitable for winter use, whilst when the air temperature is 20° or 25° C., such as in hot summer conditions, a water temperature of 40° C. would suffice.

In countries wherein the sun can be relied on to shine for most days of the year it is very common to provide hot water either exclusively or, at least in part, by solar heating. A solar panel is provided on the roof of the building and hot water is contained in a storage tank also normally situated on the roof of the building adjacent to the solar panel. Water is fed to the domestic hot water supply system via a thermally insulated pipe running from the storage tank on the roof of the building and gaining entrance to the domestic hot water supply.

Whether the water is heated using solar power or other means, some electrical backup is also normally provided in the form of an electrical immersion heater disposed within the hot water tank. The immersion heater brings the hot water up to temperature relatively quickly, and is often used fairly indiscriminately by a householder who wishes to take a bath or a shower quickly and speculates that the hot water temperature is inadequate. Owing to the fact that the householder has no way either of adjusting or even measuring the actual temperature of the hot water in the storage tank, the decision to boost the hot water temperature by using the electrical immersion heater amounts to guesswork on the part of the householder and, as often as not, will result in unnecessary wastage of energy.

Furthermore, owing to the high cost of electricity, it is obviously desirable to use an electrical emersion heater in order to boost the water temperature only to the extent that is absolutely required. For example, a person who wishes to boost the water temperature prior to taking a shower, clearly has no need to heat all of the water in the water tank which typically contains several hundred liters. Merely heating a fraction of the water tank's volume would suffice. However, it is no simple matter to indicate to the householder how much of a water tank's contents are at a desired, pre-set temperature. As is known, domestic water tanks allow for the hot water to be syphoned off at the top of the tank and to be replaced by cold water which is fed in at the bottom of the tank. Notwithstanding the constant hot water drainage and cold water replacement which thus ensues, there exists a marked temperature gradient throughout the tank such that the temperature of water toward the upper part of the tank is significantly greater than that of the water near the base of the tank. Thus, merely placing a temperature probe toward the upper surface of the tank would tend to provide an artificially high reading; whilst placing a temperature probe toward the base of the tank would provide an artificially low reading. In the former case, a householder might be tempted to take a shower under the misguided impression that there is sufficient hot water in the tank, only to find in practice that the water is too cold. In the latter case, the householder would be tempted to heat the water for an unnecessarily long time under the misguided impression that the water temperature has not yet reached a comfortable threshold.

SUMMARY OF THE INVENTION

It is an object of the invention to provide a temperature control unit for use with a domestic hot water supply system such that the drawbacks associated with hitherto proposed domestic hot water systems are significantly reduced or eliminated.

According to the invention there is provided a control unit for controlling the temperature of a domestic water supply, comprising:

a temperature sensor for inserting into a water tank so as to produce a sensor signal representative of actual water temperature in a region of said temperature sensor, an electrical immersion heater for inserting into the water tank, a set means accessible to a user of the domestic water supply for setting a desired water temperature and producing a corresponding set signal, a source of electrical power for supplying electricity to the immersion heater, and a controllable switch connected between the source of electrical power and the electrical immersion heater, and being responsive to the sensor signal and to the set signal for closing if the actual water temperature is lower than the desired water temperature and for opening if the actual water temperature is greater than the desired water temperature.

Preferably there is further provided a display coupled to the temperature sensor and responsive to the sensor signal for displaying the actual water temperature. A selector switch is provided for maintaining the controllable switch in a permanently open state so that electrical power is not provided to the electrical immersion heater. When in this condition, the actual water temperature may, if desired, be monitored and displayed.

According to a preferred embodiment, a plurality of temperature sensors are located throughout the height of the water tank each being connected to a respective indication lamp, so as to provide an indication as to what fraction of the tank's volume has reached the desired preset temperature.

BRIEF DESCRIPTION OF THE DRAWINGS

In order to understand the invention and to see how the same may be carried out in practice, a preferred embodiment will now be described, by way of non-limiting example only, with reference to the accompanying drawings, in which.

DETAILED DESCRIPTION OF PREFERRED EMBODIMENTS

Figure 1:
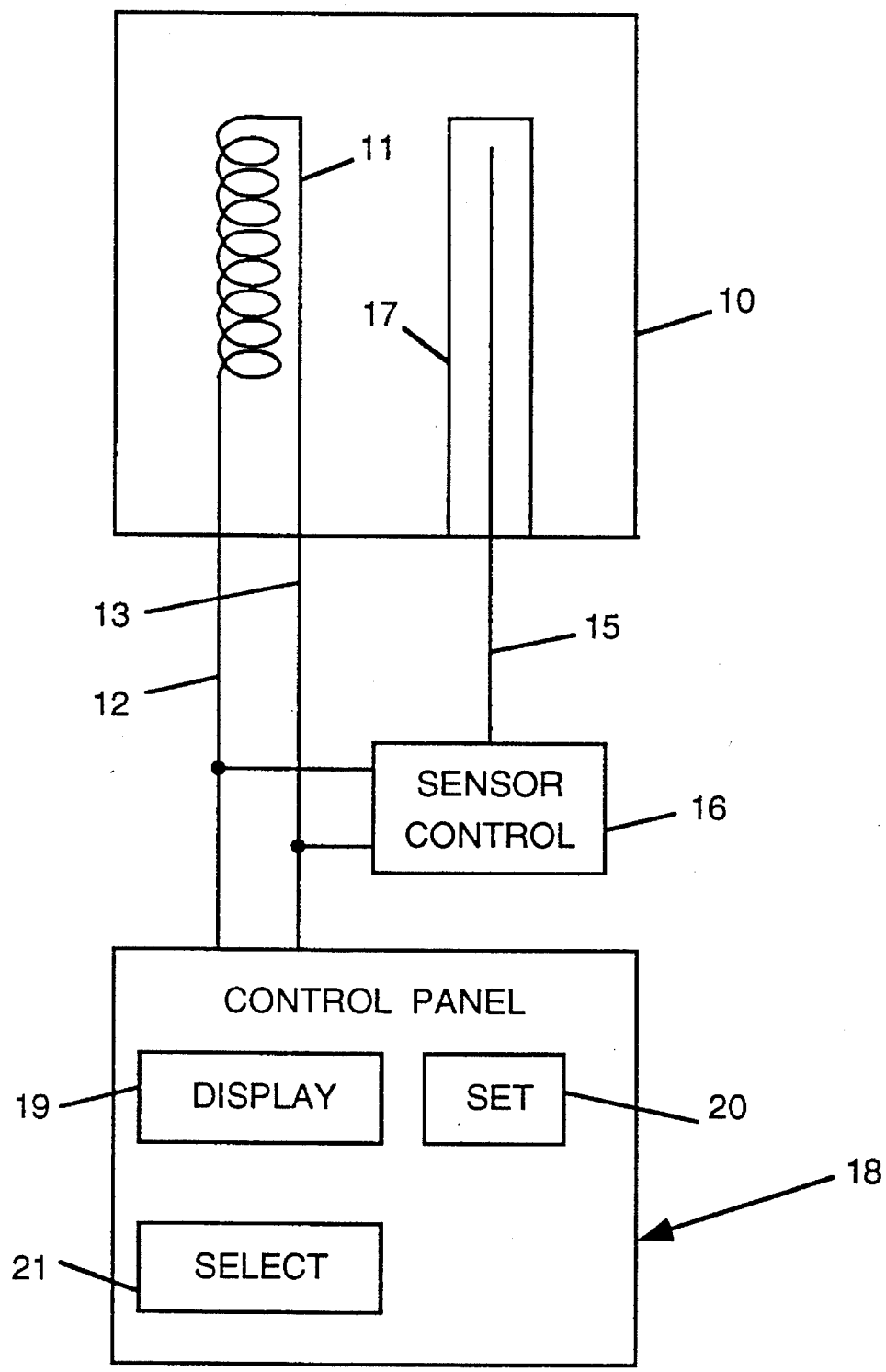
FIG. 1 is a pictorial representation showing a domestic hot water cylinder whose temperature is controlled by a temperature control unit according to the invention.
Figure 2:
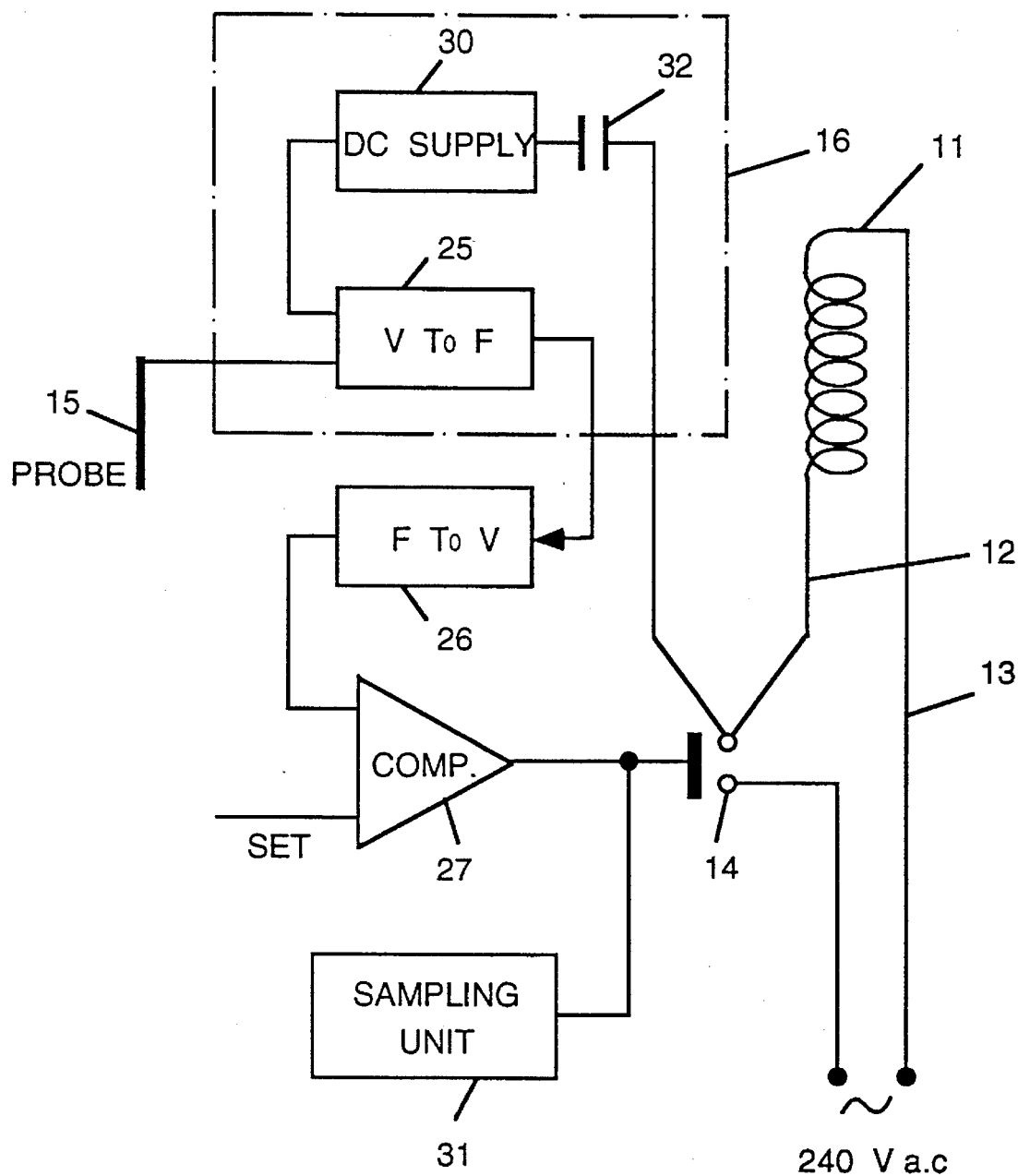
FIG. 2 shows schematically a detail of the control panel shown functionally in FIG. 1.

Referring to FIGS. 1 and 2 there is shown a water tank 10 having therein an electric immersion heater 11 which is energized via a conventional domestic A.C. power supply via a pair of electrical conductors 12 and 13. The electrical conductor 12 is connected to the A.C. power supply via a switch contact 14 whereby electrical power may be fed to the immersion heater 11 when required.

A temperature sensor consisting of a probe 15 coupled to a sensor control unit 16 is provided. The probe 15 is inserted into the hot water tank 10 so as to reach nearly to an upper extremity thereof and is surrounded by a narrow tube 17 so that the actual volume of water within the tank 10 subject to temperature measurement is relatively small.

The temperature sensor control unit 16 provides a temperature-dependent signal which is fed, via the electrical conductors 12 and 13 to a control panel 18 comprises a display 19 for displaying the measured temperature, a set means 20 for setting the water temperature to a desired value and a select means 21 having three settings. A first setting allows normal operation of the control unit whereby the water temperature is maintained at the set temperature and is displayed on the display means 19. A second select position disables the actual temperature control, whilst still allowing the water temperature to be displayed. In a third position of the select means 21, both the control unit as well as the display are disabled.

As seen more clearly in FIG. 2, the sensor control unit 16 includes a Voltage-to-Frequency converter 25 connected to the probe 15 and responsive to a temperature-dependent voltage produced thereby for converting the voltage to a frequency modulated signal whose frequency is a function of the voltage magnitude. The resulting signal has a high frequency in the order of 100 Khz which is conveyed from the sensor control unit 16 via electrical conductors 12 and 13 to the control panel 18. A Frequency-to-Voltage converter 26 in the control panel 18 converts the high frequency signal back to an equivalent voltage signal which is compared by a comparator 27 with a predetermined voltage corresponding to the set temperature.

The switch contact 14 is responsively coupled to an output of the comparator 27 so as to close if the set temperature exceeds the actual water temperature. The Voltage-to-Frequency converter 25 is powered by means of a D.C. supply 30 which, in turn, is energized via the domestic A.C. supply via the electrical conductors 12 and 13. Thus, when the switch contact 14 is open, either because the control panel 18 is set to standby mode or, alternatively, because the water temperature has reached the set temperature, electrical power will no longer be supplied via the D.C. supply 30 to the Voltage-to-Frequency converter 25. There is therefore provided a sampling unit 31 which momentarily closes the switch contact 14 at predetermined time intervals so as to pass electricity from the domestic A.C. supply through the electrical conductors 12 and 13 to a capacitor 32 (constituting an electrical storage element) which stores sufficient charge during the intermittent charging operation so as to provide sufficient voltage to the Voltage-to-Frequency converter, via the D.C. supply 30, and thereby produce the required frequency modulated sensor signal.

Figure 3:
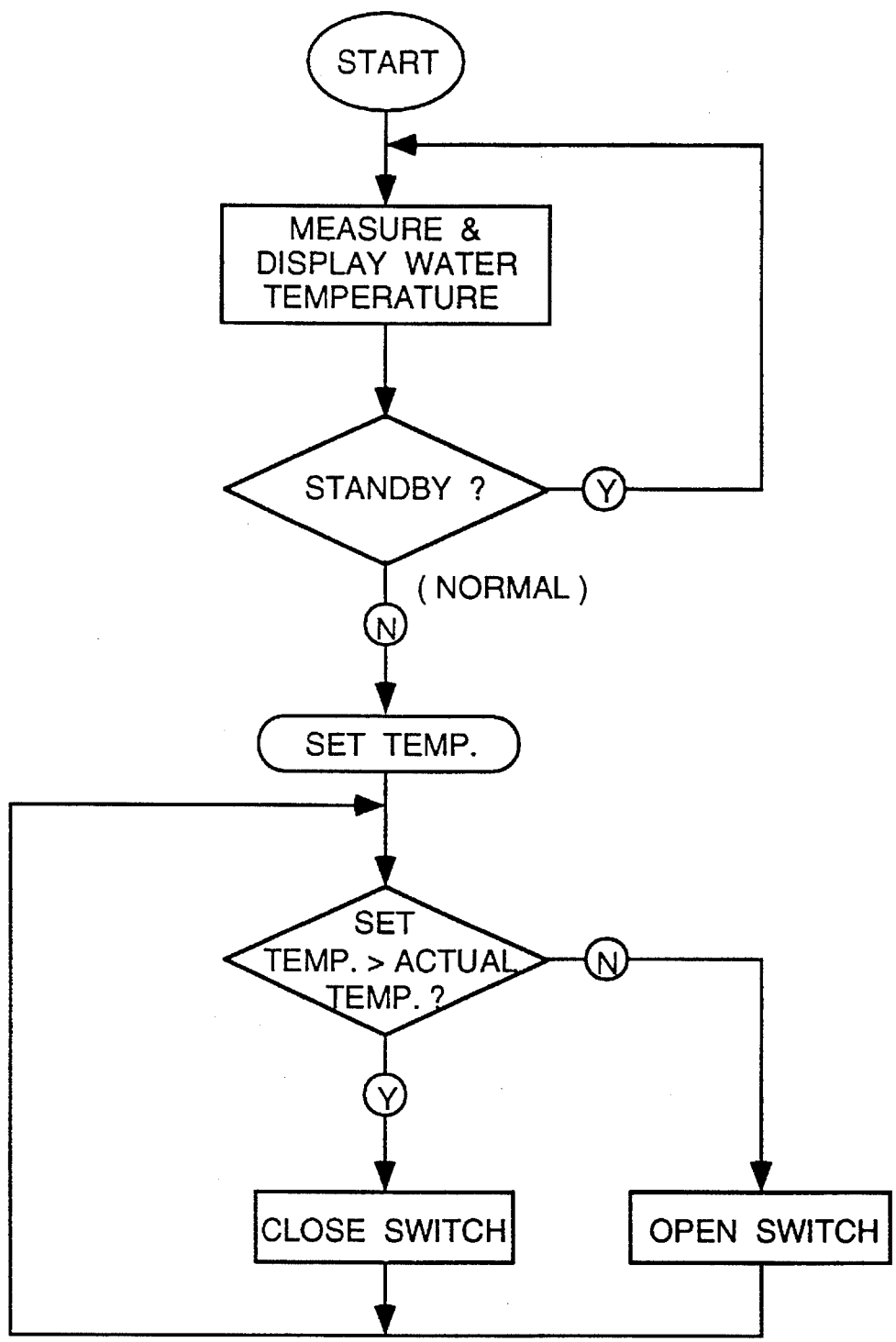
FIG. 3 is a flow diagram showing the principal operating steps of the control unit according to the invention.

Referring to FIG. 3 of the drawings there are summarized the principal operating steps of the control panel 18 as described above with reference to FIGS. 1 and 2 of the drawings. Thus, actual water temperature is measured and displayed whether the select means 21 is in normal or standby mode. If in standby mode, this cycle is simply repeated. Otherwise, in normal mode, the set means 20 is operative for selecting a set temperature and the comparator 27 is operative for comparing the set temperature with the actual temperature measured by the temperature sensor 15. If the set temperature exceeds the actual temperature then the switch contact 14 is closed; otherwise it is opened.

Figure 4:
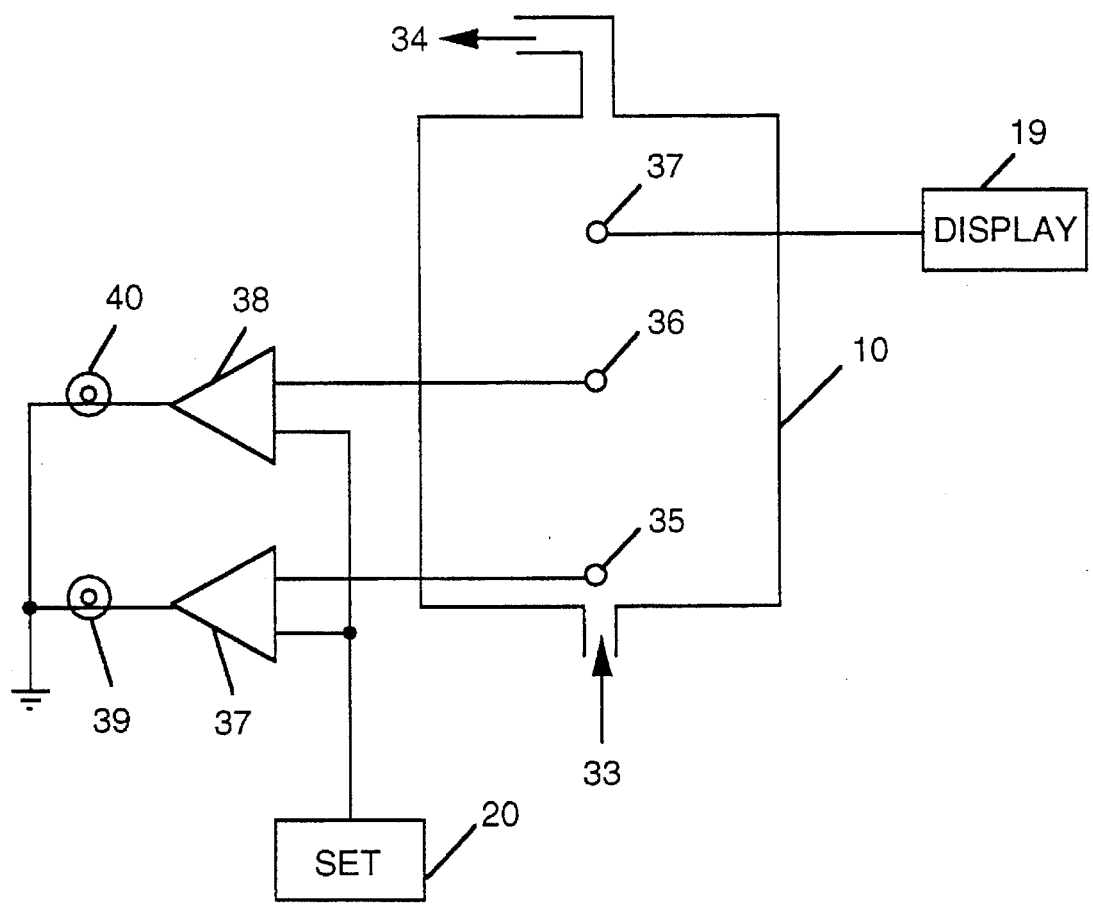
FIG. 4 is a pictorial representation of the hot water cylinder showing schematically a detail of a temperature display connected thereto.

FIG. 4 shows schematically a detail of the display 19 in accordance with a preferred embodiment which allows for a visual indication as to what fraction of the tank's volume has reached the desired preset temperature. Those components which have already been described with reference to FIGS. 1 and 2 of the drawings will be given like reference numerals. Thus, a tank 10 is provided with a cold water inlet 33 coupled to a base of the tank, and a hot water outlet 34 towards the tank's upper surface. A first auxiliary temperature sensor 35 is located toward the base of the tank proximate the cold water inlet 33; a second auxiliary temperature sensor 36 is located approximately one-third of the height of the tank 10 from its base; and a temperature sensor 37 is located approximately two-thirds of the height of the tank 10 from its base. The temperature sensor 37 is connected to the display 19 in the manner described with reference to FIGS. 1 and 2 of the drawings. The first auxiliary temperature sensor 35 is coupled to one input of a comparator 37 to whose second input is fed a signal representative of the desired set temperature derived from the set means 20 shown in FIG. 1. Likewise, the second auxiliary temperature sensor 36 is connected to a first input of a comparator 38 whose second input is also connected to the set temperature signal. An output of the first comparator 37 is connected to a first indicator lamp 39, which is typically an LED, whilst an output of the second comparator 38 is likewise connected to a second indicator lamp 40.

In such an arrangement, the display 19 is responsive to the temperature sensor 37 for indicating the actual water temperature in an upper third of the tank 10. The second auxiliary temperature sensor 36 provides an indication of the water temperature in a middle third of the tank and the second indicator lamp 40 is illuminated only if the temperature sensed by the second temperature sensor 36 has reached the desired set temperature. In similar manner, the first indicator lamp 39 illuminates only if the temperature sensed by the first auxiliary temperature sensor 35 has reached the desired preset temperature.

Thus, in use, when a householder finds it necessary to use the electrical emersion heater, the display 19 provides an indication as to whether at least the upper third of the tank's water volume has reached the desired preset temperature. However, if when this occurs both the first and second indicator lamps 39 and 40 are extinguished, the householder knows that only approximately one-third of the tank's water volume has reached the desired preset temperature. If, on the other hand, the display 19 registers the desired preset temperature and also the second indicator lamp 40 is illuminated, the first indicator lamp 39 still being extinguished, then the householder knows that approximately two-thirds of the tank's water volume has reached the desired temperature. If, however, both the first and the second indicator lamps are illuminated, then the householder knows that substantially all of the water tank's volume has reached the desired preset temperature.

Thus, in accordance with the invention the water temperature in a domestic hot water tank may be monitored and maintained at a desired set value. It will be appreciated that since the temperature sensor 15 and the associated sensor control unit 16 receive electrical power via the same electrical conductors 12 and 13 through which electricity is fed to the immersion heater 11, such a control unit is particularly well adapted for use with solar heaters which are situated on the roof of a building and which contain an electrical immersion heater whose electrical supply cable often dangles from the roof, down the wall of the building to a suitable entry point in the consumer's premises. However, it will be appreciated that a separate electrical supply cable may be provided to the sensor if desired. Likewise, the sensor signal may be fed to the control panel 18 via a separate pair of wires, thereby obviating the need to sample the water temperature intermittently, as explained above, if the switch contact 14 is open.

I claim:

1. A control unit for controlling the temperature of a domestic water supply, the control unit comprising:

an electrical immersion heater for inserting into a water tank so as to heat substantially all the water therein;

a set means accessible to a user of the domestic water supply for setting a desired water temperature and producing a corresponding set signal;

a source of electrical power for supplying electricity to the immersion heater; and a controllable switch connected between the source of electrical power and the electrical immersion heater, and being responsive to a sensor signal and to the set signal for closing if the actual water temperature is lower than the desired water temperature and for opening if the actual water temperature is greater than the desired water temperature;

wherein:

at least two temperature sensors are provided for inserting into the water tank at different predetermined heights thereof so as to produce corresponding sensor signals each representative of actual water temperature of a corresponding fractional volume of water in the tank, and a display is coupled to each temperature sensor and is responsive to the corresponding sensor signal produced thereby for displaying a representation of the actual water temperature of the corresponding fractional volume of water in the tank.

2. The control unit according to claim 1, wherein the display is selectively coupled to the set means and is responsive to the set signal for displaying said representation of the desired water temperature.

3. The control unit according to wherein the temperature sensor operates from electrical power supplied from an internal battery.

4. The control unit according to claim 1, wherein:

the temperature sensor operates from electrical power supplied at least partially from said source of electrical power, and there is further included an electrical storage element connected between the source of electrical power and the temperature sensor for storing electricity when the controllable switch is closed and for feeding the stored electricity to the temperature sensor when the controllable switch is opened.

5. The control unit according to claim 4, wherein the electrical storage element is a capacitor.

6. The control unit according to claim 1, wherein the temperature sensor includes:

voltage means for producing an electrical voltage having a magnitude substantially proportional to the actual water temperature, frequency conversion means coupled to the voltage means and responsive to the electrical voltage for converting the electrical voltage to a frequency modulated signal where frequency is a function of said voltage magnitude.

7. The control unit according to claim 6, wherein:

the sensor signal is conveyed to the controllable switch via a pair of electrical conductors through which electrical power is fed to the immersion heater, and the sensor signal is fed to the controllable switch via a voltage conversion means for converting the sensor signal to a corresponding voltage.

8. The control unit according to claim 6, wherein the frequency of the sensor signal is in the order of 100 KHz.

9. The control unit according to claim 1, further including a standby selector means coupled to the controllable switch for maintaining the controllable switch in the open state.

10. The control unit according to claim 9, further including a display coupled to the temperature sensor and responsive to the sensor signal even when the controllable switch is open for displaying the actual water temperature.

11. The control unit according to claim 10, wherein:

the temperature sensor operates from said source of electrical power, and there is provided a sampling means for intermittently energizing the temperature sensor.

12. The control unit according to claim 11, wherein the sampling means includes a capacitor disposed between the source of electrical power and the temperature sensor for storing sufficient charge when the controllable switch is closed so as to energize the temperature sensor when the controllable switch is opened for a sufficiently long time interval to produce said sensor signal.

13. The control unit according to claim 1, further comprising:

indication means each coupled to a respective one of the temperature sensors for providing an indication that the corresponding fractional volume of water has reached the desired water temperature.

14. The control unit according to claim 1, wherein:

a first one of said at least two temperature sensors is located toward a base of the tank proximate a cold water inlet thereof;

a second one of said at least two temperature sensors is located approximately one-third of the height of the tank from its base; and a third temperature sensor is located approximately two-thirds of the height of the tank from its base;

thereby giving an indication as to whether one-third, two-thirds, or substantially all of the volume of water in the tank has reached the desired temperature.

* * * * *